US012603957B2

(12) United States Patent　　(10) Patent No.:　　US 12,603,957 B2

Tammi et al.　　(45) Date of Patent:　　Apr. 14, 2026

(54) CONFERENCE CALLS

(71) Applicant: Nokia Technologies Oy, Espoo (FI)

(72) Inventors: Mikko Tapio Tammi, Tampere (FI); Riitta Elina Väänänen, Espoo (FI); Toni Mäkinen, Tampere (FI); Roope Olavi Järvinen, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 166 days.

(21) Appl. No.: 18/479,557

(22) Filed: Oct. 2, 2023

(65) Prior Publication Data

US 2024/0121342 A1　　Apr. 11, 2024

(30) Foreign Application Priority Data

Oct. 11, 2022　(EP) ..................................... 22200803

(51) Int. Cl.
　H04M 3/00　　(2024.01)
　H04M 3/56　　(2006.01)
(52) U.S. Cl.
　CPC ........... H04M 3/566 (2013.01); H04M 3/568 (2013.01)
(58) Field of Classification Search
　CPC ............................. H04M 3/566; H04M 3/588
　USPC ............................................ 379/202.01, 158
　See application file for complete search history.

(56) References Cited

U.S. PATENT DOCUMENTS

| | | | | |
|---|---|---|---|---|
| 5,768,263 A * | 6/1998 | Tischler | ................. | H04M 3/569 |
| | | | | 370/263 |
| 8,447,023 B2 * | 5/2013 | Nimri | ..................... | H04M 3/56 |
| | | | | 370/266 |
| 8,606,249 B1 | 12/2013 | Goodwin | | |
| 8,838,447 B2 * | 9/2014 | Zhan | ........................ | H04M 3/56 |
| | | | | 704/235 |
| 2010/0020954 A1 * | 1/2010 | Gilg | ...................... | H04M 3/568 |
| | | | | 379/202.01 |

(Continued)

FOREIGN PATENT DOCUMENTS

WO　　2017/106454 A1　　6/2017

OTHER PUBLICATIONS

Divya et al., "Machine Learning Algorithms in Big data Analytics", International Journal of Computer Sciences and Engineering, vol. 6, No. 1, Jan. 2018, pp. 63-70.

(Continued)

*Primary Examiner* — William J Deane, Jr.
(74) *Attorney, Agent, or Firm* — ALSTON & BIRD LLP

(57)　　ABSTRACT

Example embodiments relate to conference calls. In a method, there may be provided audio data and associated classification data from a plurality of user devices as part of a conference call, the plurality of user devices including at least a first user device and a second user device. The classification data may be indicative of one of a plurality of predetermined sound types represented by the associated audio data in a current time frame. The method may comprise determining that the audio data provided by the first user device is associated with a dominant speaker. The method may comprise controlling transmission of the audio data as part of the conference call, including preventing transmission of audio data provided by at least the second user device based on its associated classification data being indicative of a restricted sound type and the first user device being associated with a dominant speaker.

19 Claims, 6 Drawing Sheets

701 — RECEIVE AUDIO DATA FROM ONE OR MORE MICROPHONES OF A USER DEVICE FOR A CURRENT TIME FRAME

702 — CLASSIFY THE AUDIO DATA INTO ONE OF A PLURALITY OF PREDETERMINED SOUND TYPES

703 — GENERATE ASSOCIATED CLASSIFICATION DATA INDICATIVE OF THE PREDETERMINED SOUND TYPE FOR THE CURRENT TIME FRAME

704 — TRANSMIT THE AUDIO DATA AND THE ASSOCIATED CLASSIFICATION DATA TO A REMOTE APPARATUS FOR PREVENTING OR ALLOWING TRANSMISSION OF THE AUDIO DATA TO OTHER DEVICES AS PART OF THE CONFERENCE CALL BASED AT LEAST ON THE ASSOCIATED CLASSIFICATION DATA

(56) References Cited

U.S. PATENT DOCUMENTS

| | | | | |
|---|---|---|---|---|
| 2011/0187814 | A1 | 8/2011 | Nimri et al. | |
| 2018/0374496 | A1* | 12/2018 | Shi | G10L 21/0208 |
| 2020/0127865 | A1* | 4/2020 | Cartwright | H04L 65/1083 |
| 2022/0139388 | A1* | 5/2022 | Sharifi | G10L 15/02 |
| | | | | 704/231 |
| 2023/0077283 | A1* | 3/2023 | Mehta | G10L 17/18 |
| 2024/0046943 | A1* | 2/2024 | Pichaimurthy | G10L 15/26 |

OTHER PUBLICATIONS

Yamashita et al., "Convolutional neural networks: an overview and application in radiology", Insights into Imaging, vol. 9, 2018, pp. 611-629.

Extended European Search Report received for corresponding European Patent Application No. 22200803.9, dated Mar. 17, 2023, 9 pages.

Office action received for corresponding European Patent Application No. 22200803.9, dated Dec. 9, 2024, 4 pages.

EP Office Action Mailed on Dec. 15, 2025 for EP Application No. 22200803, 4 page(s).

* cited by examiner

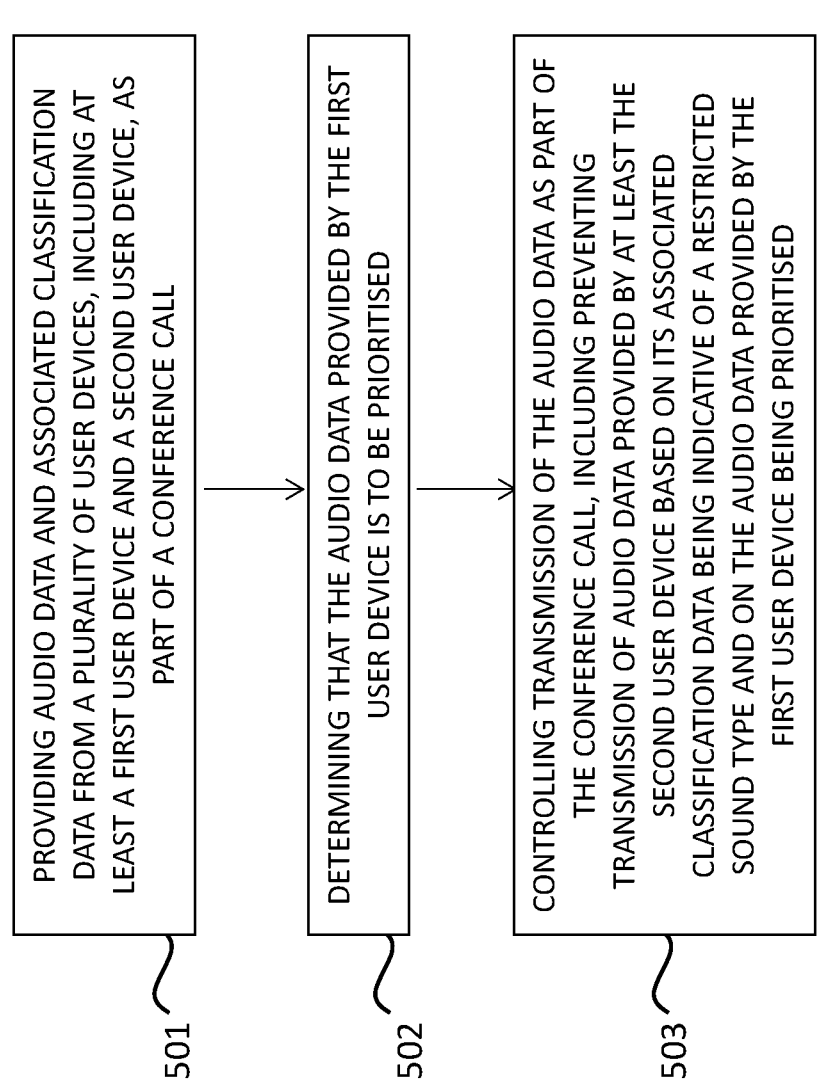

PROVIDING AUDIO DATA AND ASSOCIATED CLASSIFICATION DATA FROM A PLURALITY OF USER DEVICES, INCLUDING AT LEAST A FIRST USER DEVICE AND A SECOND USER DEVICE, AS PART OF A CONFERENCE CALL

501

DETERMINING THAT THE AUDIO DATA PROVIDED BY THE FIRST USER DEVICE IS TO BE PRIORITISED

502

CONTROLLING TRANSMISSION OF THE AUDIO DATA AS PART OF THE CONFERENCE CALL, INCLUDING PREVENTING TRANSMISSION OF AUDIO DATA PROVIDED BY AT LEAST THE SECOND USER DEVICE BASED ON ITS ASSOCIATED CLASSIFICATION DATA BEING INDICATIVE OF A RESTRICTED SOUND TYPE AND ON THE AUDIO DATA PROVIDED BY THE FIRST USER DEVICE BEING PRIORITISED

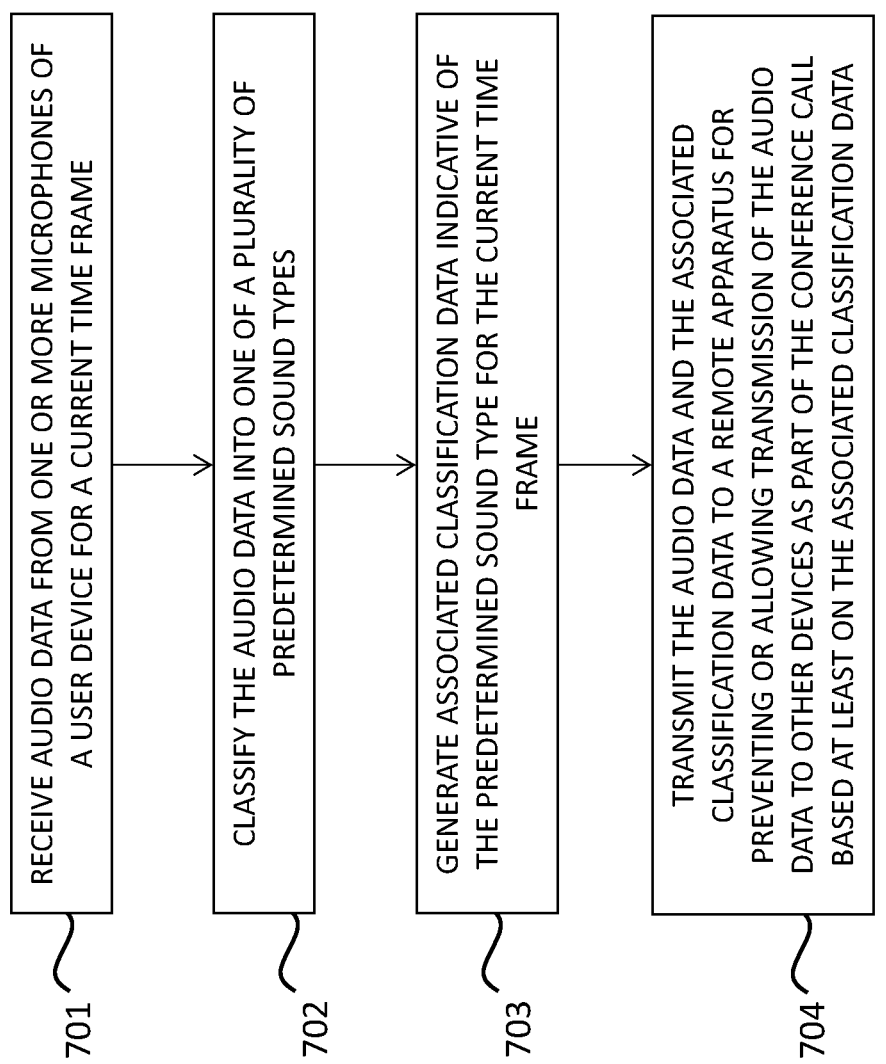

RECEIVE AUDIO DATA FROM ONE OR MORE MICROPHONES OF A USER DEVICE FOR A CURRENT TIME FRAME

701

CLASSIFY THE AUDIO DATA INTO ONE OF A PLURALITY OF PREDETERMINED SOUND TYPES

702

GENERATE ASSOCIATED CLASSIFICATION DATA INDICATIVE OF THE PREDETERMINED SOUND TYPE FOR THE CURRENT TIME FRAME

703

TRANSMIT THE AUDIO DATA AND THE ASSOCIATED CLASSIFICATION DATA TO A REMOTE APPARATUS FOR PREVENTING OR ALLOWING TRANSMISSION OF THE AUDIO DATA TO OTHER DEVICES AS PART OF THE CONFERENCE CALL BASED AT LEAST ON THE ASSOCIATED CLASSIFICATION DATA

CONFERENCE CALLS

TECHNICAL FIELD

Example embodiments relate to an apparatus, method and computer program associated with conference calls.

BACKGROUND

A conference call is a communications session between multiple user devices and therefore multiple users or parties associated with the respective user devices. At a time a conference call is established, one or more communications channels may be established over a network between the user devices, possibly using a conference server. Audio data from a given user device which may be captured using one or more microphones may be transmitted to other user devices via, for example, a conference server. The audio data may be output at the other user devices via one or more loudspeakers, earbuds, earphones or headphones of the one or more other user devices.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, this specification describes an apparatus, comprising means for: providing audio data and associated classification data from a plurality of user devices as part of a conference call, the plurality of user devices including at least a first user device and a second user device, the classification data indicative of one of a plurality of predetermined sound types represented by the associated audio data in a current time frame; determining that the audio data provided by the first user device is to be prioritised; and controlling transmission of the audio data as part of the conference call, including preventing transmission of audio data provided by the second user device based on its associated classification data being indicative of a restricted sound type and on the audio data provided by the first user device being prioritised.

The controlling means may be further configured to allow transmission of the audio data provided by one or more of the plurality of user devices, other than the second user device, based on the respective associated classification data being a non-restricted sound type.

The controlling means may be configured to control mixing of the audio data.

The audio data provided by the first user device may be prioritised based on its associated classification data being indicative of a normal speech sound type in the current time frame and audio data provided by the first user device being prioritised in a previous time frame.

The audio data provided by the first user device may be prioritised based on its associated classification data being indicative of a normal speech sound type in the current time frame and classification data, associated with a different user device which provided prioritised data in a previous time frame, no longer being indicative of a normal speech sound type in the current time frame.

The audio data provided by the first user device may be prioritised based on: its associated classification data being indicative of a normal speech sound type in the current time frame; classification data associated with devices other that the first user device not being indicative of a normal speech sound type in the current time frame; and no audio data being prioritised in a previous time frame.

A plurality of candidate user devices having associated classification data indicative of a normal speech type may be identified in the current time frame and wherein the first user device may be selected from the candidate user devices based on a predetermined selection algorithm. The predetermined selection algorithm may select the first user device based on one or more of: a predetermined order of the plurality of candidate user devices; the candidate user device that set-up or is hosting the conference call; and respective transmission latencies associated with the plurality of candidate user devices.

The restricted sound type may comprise a normal speech sound type other than an interjection sound type.

The normal speech sound type may comprises speech having at least a threshold number of words in the current time frame and wherein an interjection sound type may be identified as comprising less than the threshold number of words in the current time frame. The normal speech sound type may alternatively or additionally be identified based on duration, e.g. speech greater than one second in length.

A non-restricted sound type may comprise one or more of: a silence or background noise sound type; a coughing sound type; an emotive sound type; a singing sound type; and an interjection sound type.

The apparatus may further comprise means for sending a notification to the second user device for informing a user thereof of the prevented transmission.

The providing means may be configured to: receive the audio data from the plurality of user devices for the current time frame; classify the audio data into one of a plurality of predetermined sound types; and generate the classification data associated with the respective audio data indicative of the predetermined sound type for the current time frame.

The providing means may be configured to classify the audio data using one or more machine-learned models.

The apparatus may comprise a conference server or a part thereof.

According to a second aspect, this specification describes a method, comprising: providing audio data and associated classification data from a plurality of user devices as part of a conference call, the plurality of user devices including at least a first user device and a second user device, the classification data indicative of one of a plurality of predetermined sound types represented by the associated audio data in a current time frame; determining that the audio data provided by the first user device is to be prioritised; and controlling transmission of the audio data as part of the conference call, including preventing transmission of audio data provided by the second user device based on its associated classification data being indicative of a restricted sound type and on the audio data provided by the first user device being prioritised.

Transmission of the audio data provided by one or more of the plurality of user devices, other than the second user device, may be allowed based on the respective associated classification data being a non-restricted sound type.

Controlling may mean controlling mixing of the audio data.

The audio data provided by the first user device may be prioritised based on its associated classification data being indicative of a normal speech sound type in the current time frame and audio data provided by the first user device being prioritised in a previous time frame. The audio data provided by the first user device may be prioritised based on its associated classification data being indicative of a normal speech sound type in the current time frame and classification data, associated with a different user device which provided prioritised data in a previous time frame, no longer being indicative of a normal speech sound type in the current time frame.

The audio data provided by the first user device may be prioritised based on: its associated classification data being indicative of a normal speech sound type in the current time frame; classification data associated with devices other that the first user device not being indicative of a normal speech sound type in the current time frame; and no audio data being prioritised in a previous time frame.

A plurality of candidate user devices having associated classification data indicative of a normal speech type may be identified in the current time frame and wherein the first user device may be selected from the candidate user devices based on a predetermined selection algorithm. The predetermined selection algorithm may select the first user device based on one or more of: a predetermined order of the plurality of candidate user devices; the candidate user device that set-up or is hosting the conference call; and respective transmission latencies associated with the plurality of candidate user devices.

The restricted sound type may comprise a normal speech sound type other than an interjection sound type.

The normal speech sound type may comprises speech having at least a threshold number of words in the current time frame and wherein an interjection sound type may be identified as comprising less than the threshold number of words in the current time frame. The normal speech sound type may alternatively or additionally be identified based on duration, e.g. speech greater than one second in length.

A non-restricted sound type may comprise one or more of: a silence or background noise sound type; a coughing sound type; an emotive sound type; a singing sound type; and an interjection sound type.

The method may further comprise sending a notification to the second user device for informing a user thereof of the prevented transmission.

The method may further comprise receiving the audio data from the plurality of user devices for the current time frame; classifying the audio data into one of a plurality of predetermined sound types; and generating the classification data associated with the respective audio data indicative of the predetermined sound type for the current time frame.

Classify the audio data may use one or more machine-learned models.

The method may be performed at a conference server or a part thereof.

According to a third aspect, this specification describes a computer program comprising instructions for causing an apparatus to perform at least the following: providing audio data and associated classification data from a plurality of user devices as part of a conference call, the plurality of user devices including at least a first user device and a second user device, the classification data indicative of one of a plurality of predetermined sound types represented by the associated audio data in a current time frame; determining that the audio data provided by the first user device is to be prioritised; and controlling transmission of the audio data as part of the conference call, including preventing transmission of audio data provided by the second user device based on its associated classification data being indicative of a restricted sound type and on the audio data provided by the first user device being prioritised.

According to a fourth aspect, this specification describes a computer-readable medium (such as a non-transitory computer-readable medium) comprising program instructions stored thereon for performing at least the following: providing audio data and associated classification data from a plurality of user devices as part of a conference call, the plurality of user devices including at least a first user device and a second user device, the classification data indicative of one of a plurality of predetermined sound types represented by the associated audio data in a current time frame; determining that the audio data provided by the first user device is to be prioritised; and controlling transmission of the audio data as part of the conference call, including preventing transmission of audio data provided by the second user device based on its associated classification data being indicative of a restricted sound type and on the audio data provided by the first user device being prioritised.

According to a fifth aspect, this specification describes an apparatus comprising: at least one processor; and at least one memory including computer program code which, when executed by the at least one processor, causes the apparatus to: provide audio data and associated classification data from a plurality of user devices as part of a conference call, the plurality of user devices including at least a first user device and a second user device, the classification data indicative of one of a plurality of predetermined sound types represented by the associated audio data in a current time frame; determine that the audio data provided by the first user device is to be prioritised; and control transmission of the audio data as part of the conference call, including preventing transmission of audio data provided by the second user device based on its associated classification data being indicative of a restricted sound type and on the audio data provided by the first user device being prioritised.

According to a sixth aspect, this specification describes an apparatus, comprising means for: receiving audio data from one or more microphones of a user device for a current time frame; classifying the audio data into one of a plurality of predetermined sound types; generating associated classification data indicative of the predetermined sound type for the current time frame; and transmitting the audio data and the associated classification data to a remote apparatus for preventing or allowing transmission of the audio data to other devices as part of a conference call based at least on the associated classification data.

The associated classification data may be indicative of a sound type comprising one or more of: a normal speech sound type; a silence or background noise sound type; a coughing sound type; an emotive sound type; a singing sound type; and an interjection sound type.

Where the audio data comprises speech, the normal speech sound type may be identified as comprising speech having at least a threshold number of words in the current time frame and wherein an interjection sound type is identified as comprising less than the threshold number of words in the current time frame.

The classifying means may be configured to classify the audio data using one or more machine-learned models.

Where the audio data comprises speech, the classifying means may be configured to buffer the audio data in a memory of the apparatus until it is determined if the speech is classified as a normal speech sound type or an interjection sound type, the transmitting means being configured to transmit the audio signal and the associated classification data when the classification is complete.

The apparatus may be a user device.

According to a seventh aspect, this specification describes a method, comprising: receiving audio data from one or more microphones of a user device for a current time frame; classifying the audio data into one of a plurality of predetermined sound types; generating associated classification data indicative of the predetermined sound type for the current time frame; and transmitting the audio data and the associated classification data to a remote apparatus for preventing or allowing transmission of the audio data to other devices as part of a conference call based at least on the associated classification data.

The associated classification data may be indicative of a sound type comprising one or more of: a normal speech sound type; a silence or background noise sound type; a coughing sound type; an emotive sound type; a singing sound type; and an interjection sound type.

Where the audio data comprises speech, the normal speech sound type may be identified as comprising speech having at least a threshold number of words in the current time frame and wherein an interjection sound type is identified as comprising less than the threshold number of words in the current time frame.

The audio data may be classified using one or more machine-learned models.

Where the audio data comprises speech, the audio data may be buffered in a memory until it is determined if the speech is classified as a normal speech sound type or an interjection sound type, and the method may comprise transmitting the audio signal and the associated classification data when the classification is complete.

The method may be performed at a user device.

According to an eighth aspect, this specification describes a computer program comprising instructions for causing an apparatus to perform at least the following: receiving audio data from one or more microphones of a user device for a current time frame; classifying the audio data into one of a plurality of predetermined sound types; generating associated classification data indicative of the predetermined sound type for the current time frame; and transmitting the audio data and the associated classification data to a remote apparatus for preventing or allowing transmission of the audio data to other devices as part of a conference call based at least on the associated classification data.

According to a ninth aspect, this specification describes a computer-readable medium (such as a non-transitory computer-readable medium) comprising program instructions stored thereon for performing at least the following: receiving audio data from one or more microphones of a user device for a current time frame; classifying the audio data into one of a plurality of predetermined sound types; generating associated classification data indicative of the predetermined sound type for the current time frame; and transmitting the audio data and the associated classification data to a remote apparatus for preventing or allowing transmission of the audio data to other devices as part of a conference call based at least on the associated classification data.

According to a fifth aspect, this specification describes an apparatus comprising: at least one processor; and at least one memory including computer program code which, when executed by the at least one processor, causes the apparatus to: receive audio data from one or more microphones of a user device for a current time frame; classify the audio data into one of a plurality of predetermined sound types; generate associated classification data indicative of the predetermined sound type for the current time frame; and transmit the audio data and the associated classification data to a remote apparatus for preventing or allowing transmission of the audio data to other devices as part of a conference call based at least on the associated classification data.

BRIEF DESCRIPTION OF DRAWINGS

Example embodiments will now be described, by way of non-limiting example, with reference to the accompanying drawings, in which:

FIG. 5 is a flow diagram indicating processing operations that may be performed by part of a conference system according to one or more example embodiments;

FIG. 7 is a flow diagram indicating processing operations that may be performed by another part of a conference system according to one or more example embodiments;

DETAILED DESCRIPTION

Figures 1, 2:
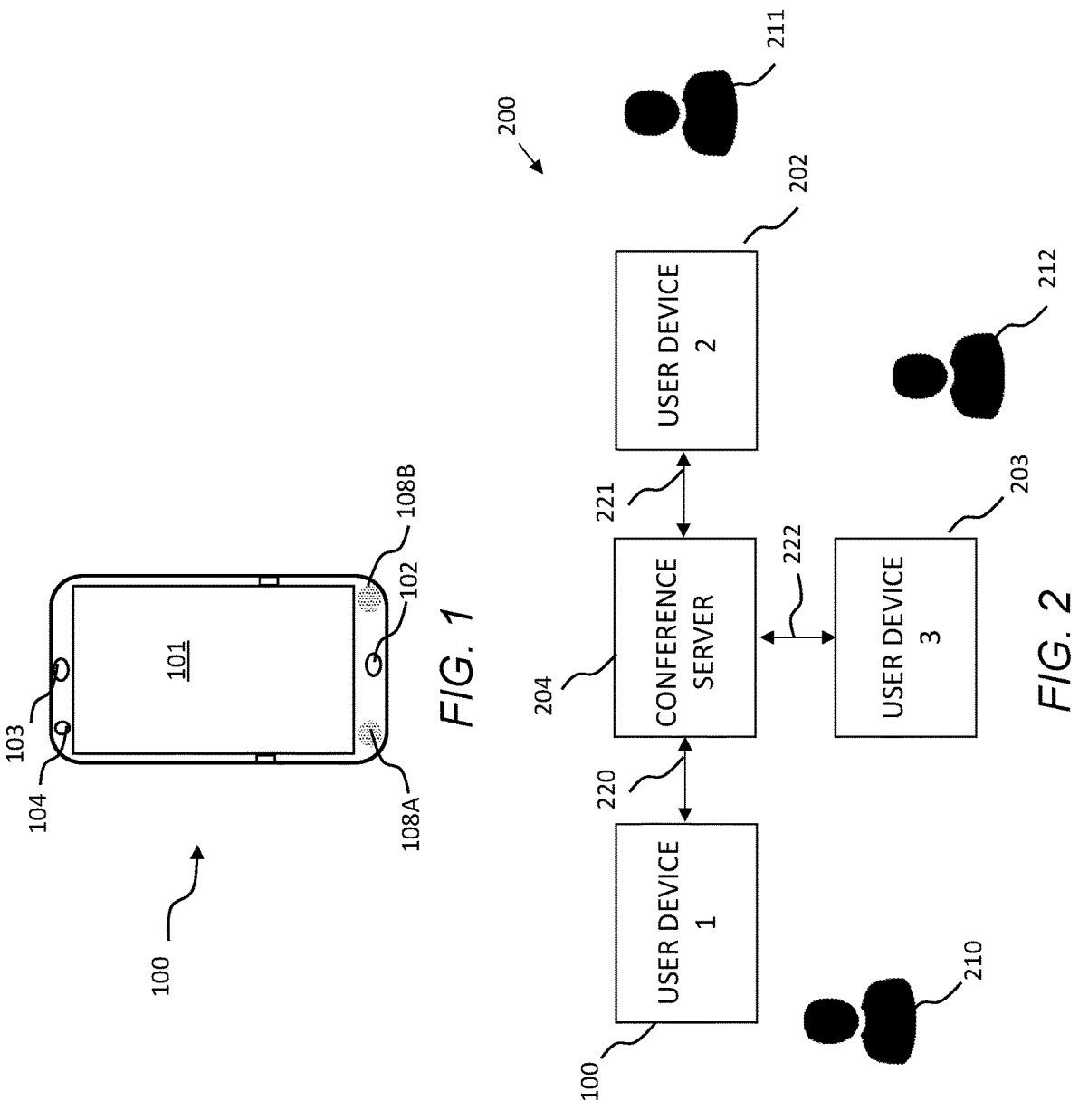
FIG. 1 is a front plan view of a user device.
FIG. 2 is a schematic block diagram of a conference system.

Example embodiments relate to an apparatus, method and computer program associated with conference calls. A conference call may be an audio-only conference call or one that comprises a mixture of video and audio data.

A conference call is a communications session between multiple user devices and therefore users or parties associated with the respective user devices. The communications session may involve the transmission of audio data for transmission over a network to one or more other user devices that are part of the call or communications session.

The audio data may be captured by one or more transducers, e.g. microphones, which form part of, or are connected to, a particular user device. The captured audio data may be transmitted over the network to the other user devices as part of the conference call, possibly but not necessarily, via a conference server. Video data, if provided, may be captured by one or more cameras, which form part of, or are connected to, the particular user device. The captured video data may also be transmitted over the network to the other user devices as part of the conference call.

The other user devices may decode and output the received audio data via one or more loudspeakers. The loudspeakers may comprise part of the receiving user device or may be external loudspeakers connected to the receiving user device via a wired or wireless communications protocol. For example, the audio data may be output to loudspeakers within earbuds, earphones, headphones or a head-mounted device (HMD) in wired or wireless communication with the one or more other user devices.

The video data, if captured, may be output to a display device of the one or more other user devices, for example in respective windows of a user interface.

A conference call may involve one or more communications channels being set-up between two or more user devices over the network, and therefore between users or parties associated with the respective user devices. A conference session may comprise, for example, one or more channels set up between two or more devices which are participants of the conference session. The one or more communications channels may be established to provide, typically, a multicast data feed from a particular user device to each of the other user devices in real-time or near real-time. The one or more communications channels may be bi-directional communications channels.

A user device may comprise any device operable by one or more users and configured to transmit and receive data over a network. The network may be any suitable form of communications network, for example an Internet Protocol (IP) based network.

A user device may comprise processing functionality for executing one or more applications, for example a conference call or video conference application. The video conference application may comprise sub-functionality of another application, such as a social media application.

A user device may also comprise one or more input modules and one or more output modules.

For example, a user device may comprise one or more input transducers and one or more output transducers.

For example, the one or more input transducers may comprise one or more microphones for converting sound waves to electrical signals which may be stored, processed and transmitted as audio data. If two or more microphones are provided, the user device may be capable of producing a spatial audio signal which includes a spatial percept enabling a listening user at a receiving user device to perceive where one or more sounds, such as speech from a user of the transmitting user device, is or are coming from.

A user device may comprise, but is not limited to, a smartphone, a digital assistant, a digital music player, a personal computer, a laptop, a tablet computer or a wearable device such as a smartwatch. A user device may be capable of establishing a communication session with one or more other user devices via a network, e.g. as a conference session.

A user device may be configured to transmit and receive data using protocols for 3G, 4G, LTE, 5G or any future generation communication protocol. The user device may comprise means for short-range communications using, for example, Bluetooth, Zigbee or WiFi. The user device may comprise one or more antennas for communicating with external devices.

Referring to FIG. 1, an example first user device is shown in the form of a smartphone 100. The smartphone 100 may comprise, on a front side, a touch-sensitive display (hereafter "display") 101, a microphone 102, a loudspeaker 103 and a front-facing camera 104. The smartphone 100 may additionally comprise a rear-facing camera (not shown) on a rear side of the smartphone. The front-facing camera 104 may be enabled during, for example, enablement of a conference call application whereby video data captured by the front-facing camera may be transmitted over an established conference session.

The smartphone 100 may also comprise additional microphones (not shown) at different positions on the smartphone for stereo or spatial capture.

The smartphone 100 may also comprise additional first and second loudspeakers 108A, 108B at different positions on the smartphone. One or both of the first and second loudspeakers 108A, 108B may be configured to render received audio data, which may be received as part of a conference session, in a monaural, stereo or spatial audio format.

Referring to FIG. 2, a conference system 200 is shown.

The conference system 200 may comprise a first user device 100, a second user device 202, a third user device 203 and a conference server 204. It may be assumed that the smartphone 100 described in relation to FIG. 1 comprises the first user device 100.

For the sake of illustration, the conference system 200 shown in FIG. 2 comprises Only two other remote devices, namely the second user device 202 and the third user device 203, but the conference system may comprise any number of user devices involved in a conference session.

A first user 210 may use the first user device 100, a second user 211 may use the second user device 202 and a third user 212 may use the third user device 203. The user devices 100, 202, 203 may, as is typical, be in different remote places.

The second and third user devices 202, 203 may comprise any of, for example, a smartphone, a digital assistant, a digital music player, a personal computer, a laptop, a tablet computer or a wearable device such as a smartwatch. The second and third user devices 203 may comprise the same or similar functionality to the first user device 100, respectively comprising, for example, a display screen, one or more microphones, one or more loudspeakers and, possibly, one or more front-facing cameras.

Each of the first, second and third user devices 100, 202, 203 may communicate streams of captured audio data with the other user devices via the conference server 204 as part of a conference session, whether as an audio-only conference or videoconference. It will be assumed that the conference session described herein is an audio-only conference.

For example, the first user device 100 may communicate a first audio stream 220 to the conference server 204. The second user device 202 may communicate a second audio stream 221 to the conference server 204. The third user device 203 may communicate a third audio stream 222 to the conference server 204. Although the first, second and third audio streams 220, 221, 222 are represented by single lines, indicative of bidirectional channels, there may be separate channels, one for transmission and one for reception.

The first, second and third audio streams 220, 221, 222 may comprise audio packets which may comply with any suitable conference standard, such as the Real Time Protocol (RTP).

The audio packets may, for example, comprise a packet header comprising control information and a packet body comprising the audio data content. The packet header may, for example, comprise a sequence number, which indicates the sequential position of a packet in a stream of transmitted packets. The packet header may also comprise a timestamp which indicates the timing of transmitting the packet. The packet body may comprise encoded audio which was captured during a time slot before transmitting the packet.

One or more of the first, second and third user devices 100, 202, 203 and the conference server 204 may comprise an apparatus such as that shown and described below with reference to FIG. 8. One or more of the first, second and third user devices 100, 202, 203 and the conference server 204 may be configured by means of hardware, software, firmware or a combination thereof to perform operations described below, for example with reference to FIGS. 5 and 7.

Figures 3, 4:
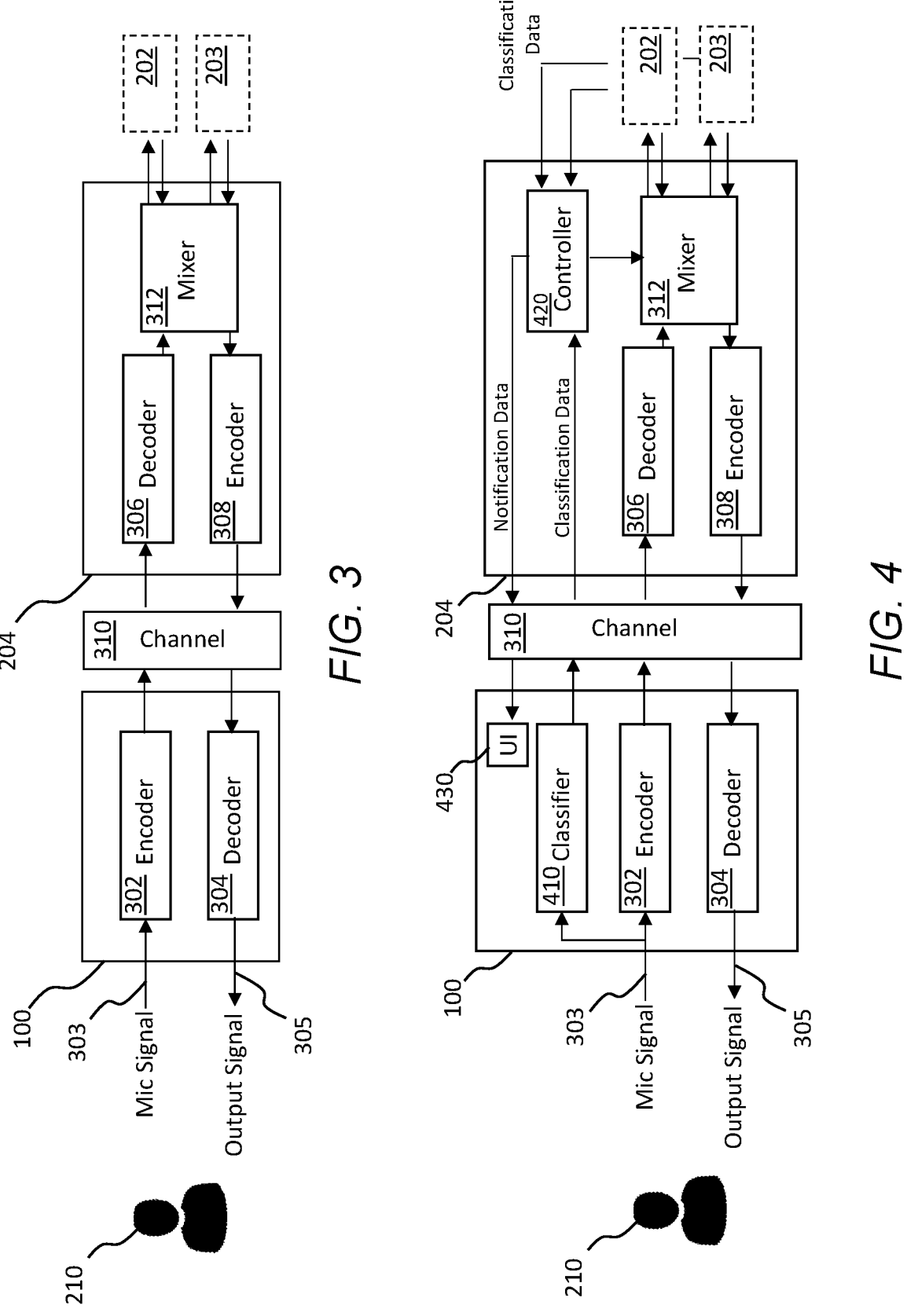
FIG. 3 is a schematic block diagram of functional modules of a first user device and conference server which may form part of the FIG. 2 conference system.
FIG. 4 is a schematic block diagram of functional modules including a first user device and conference server according to one or more example embodiments.

FIG. 3 is a block diagram of part of the FIG. 2 system, showing in greater technical detail the first user device 100 in communication with the conference server 204.

The first user device 100 may comprise at least a first encoder 302 and a first decoder 304. The first encoder 302 is configured to receive a first audio signal, or microphone signal 303, from the one or more microphones of the first user device 100. The microphone signal may pass through an analogue to digital converter (ADC) (not shown) and possibly other pre-processing modules to provide first audio data to the first encoder 302 which then encodes the first audio data, e.g. using RPC, for transmission as the first audio stream 220 over a channel 310. Non-limiting examples of other pre-processing modules may include filtering, noise reduction, spatial processing, level control and echo cancellation modules.

The conference server 204 may comprise a second decoder 306 and a second encoder 308, as well as a mixer 312 or equivalent processing circuitry. The second decoder 306 may receive the first audio stream 220 from the channel 310 and is configured to decode it to provide a received version of the first audio data which is then provided to the mixer 312.

The mixer 312 similarly receives audio data, if transmitted, from the other user devices which are part of the conference call, in this case second and third audio data from the second and third user devices 202, 203. The mixer 312 is configured to mix or combine the received and decoded audio data into a data stream, which may be referred to as the conference stream. The mixer 312 may perform other operations such as gain control and/or noise reduction.

The conference stream may be provided to the second encoder 308 which encodes it for transmission to the first, second and third user devices 100, 202, 203. For example, the encoded conference stream may be transmitted to the first user device 100 over the channel 310 for receipt and decoding by the first decoder 304. In many cases, the conference stream may be different for each user because the stream typically does not include the user's own voice.

The decoded conference signal may then pass through a digital to analogue converter (DAC) (not shown) and is output as an output signal 305 to the one or more loudspeakers of the first user device 100.

Certain elements of the FIG. 3 system may introduce latencies or delays which may create a confusing or other adverse experience for one or more users on a conference call. For example, the network over which the encoded audio data is transmitted and received (via the channel 310 in the FIG. 3 example) may introduce latencies, for example because the network is an IP or a similar-based network. This may vary depending on the connection quality, variation in network loads etc. of the network. Further, components such as the first and second encoders 302, 308, first and second decoders 304, 306 may introduce delays as a consequence of their chain of processing. In the context of a conference call, two users, e.g. the first and second users 210, 211, may be speaking simultaneously; however this does not become apparent in the received and decoded conference signal for some time due to the one or more delays. Then, the first and second users 210, 211 may not be sure whether they should stop speaking or carry on speaking. The problem is particularly apparent where two or more users are speaking relatively long statements or sentences, and usually results in confusion, lost time and requires repetition of speech.

Example embodiments seek to alleviate or avoid such situations by means of technical implementations to be described herein.

FIG. 4 is a block diagram of part of the FIG. 2 system, showing the first user device 100 and the conference server 204 adapted according to one or more example embodiments. The second and third user devices 202, 203 may also connect to the conference server and may operate in the same or similar way as the first user device 100.

The first user device 100 may comprise the first encoder 302 and first decoder 304 as described in relation to FIG. 3.

The first user device 100 may also comprise a classifier 410 and, optionally, a user interface, UI, 430.

The classifier 410 may be configured to receive the first audio signal, or microphone signal 303 as first audio data for a current time frame, which we may denote as $t_c$, and to classify the first audio data into one of a plurality of predetermined sound types. Examples will be described below.

The classifier 410 may also be configured to generate associated classification data, e.g. classification metadata, indicative of the predetermined sound type for the current time frame $t_c$.

The first user device 100 may transmit the first audio data and the associated classification data to the conference server 204.

The association between the first audio data and the classification data may be indicated using a timestamp, e.g. a common value of $t_c$ transmitted with both types of data.

Alternatively, or additionally, the classification data may be incorporated into a data field of the encoded first audio data, so that one encoded audio stream is transmitted incorporating both types of data and the association between the two types of data is therefore inherent.

The conference server 204 may comprise the second decoder 306, the second encoder 308, and the mixer 312 as described in relation to FIG. 3.

The conference server 204 may also comprise a controller 420.

The controller 420 may be configured to receive the classification data from the classifier 410 and, as will be described below, and to control transmission of the first audio data to the other user devices in a conference signal based at least partly on the associated classification data for the current time frame $t_c$.

In addition, the conference server 204 may be configured to receive audio data and associated classification data from other user devices, such as the second and third user devices 202, 203, for controlling transmission of the second and third audio data in the conference signal in a corresponding way.

FIG. 5 is a flow diagram indicating processing operations that may be performed by, for example, the controller 420 of the conference server 204 according to one or more example embodiments. The processing operations may be performed by means of hardware, software, firmware or a combination thereof.

A first operation 501 may comprise providing audio data and associated classification data from a plurality of user devices as part of a conference call, the plurality of user devices including at least a first user device and a second user device, the classification data indicative of one of a plurality of predetermined sound types represented by the associated audio data in a current time frame $t_c$.

For example, the first and second user devices 100, 202 referred to above with respect to FIG. 4 may comprise the first and second user devices in the first operation 501. In other embodiments, different user devices may comprise the first and second user devices in the first operation 501.

The classification data may comprise metadata indicative of the user device and the predetermined sound type to which the audio data is classified. The metadata may also comprise a timestamp or similar indicative of the time frame, $t_n$, when the corresponding audio data was captured.

A second operation 502 may comprise determining that the audio data provided by the first user device is to be prioritised.

A third operation 503 may comprise controlling transmission of the audio data as part of the conference call, including preventing transmission of audio data provided by the second user device based on its associated classification data being indicative of a restricted sound type and on the audio data provided by the first user device being prioritised.

In the second operation 502, determining that the audio data is to be prioritised may be based on one or more characteristics of the audio data.

For example, audio data having characteristics of normal human speech may be considered more important than, say, silence, background sounds, coughing sounds, emotive sounds such as laughter, singing sounds and/or interjections.

In example embodiments, whether or not audio data from a particular user device was previously prioritised and/or was not prioritised, may be taken into account.

For example, the audio data provided by the first user device 100 may be prioritised based on its associated classification data being indicative of a normal speech sound in the current time frame $t_c$ and the first user or user device was prioritized also in a previous time frame, e.g. the time frame $t_c-1$ immediately prior to the current time frame.

For example, the audio data provided by the first user device 100 may be prioritised based on its associated classification data being indicative of a normal speech sound type in the current time frame $t_c$ and classification data, associated with another user device which was prioritised in the previous time frame $t_c-1$, no longer being indicative of a normal speech sound type in the current time frame $t_c$. In this case, the first user device 100 may replace said other user device as providing prioritised audio data. Where there are a plurality of user devices, including the first user device 100, in which their respective audio data is associated with classification data indicative of normal speech sound types, then these may be termed candidate user devices and a predetermined selection algorithm may be used to select one of these candidates as providing the prioritised audio data.

For example, the predetermined selection algorithm may cause selection based on one or more of:

a predetermined order of the plurality of candidate user devices;

the candidate user device that set-up or is hosting the conference call; and/or respective transmission latencies associated with the plurality of candidate user devices.

So, for example, audio data provided by the first user device 100 may be selected on the basis that the first user device set-up or is hosting the conference call.

In another example, where there was no prioritised audio data in the previous time frame $t_c-1$ and in the current time frame only one user device, e.g. the first user device 100, has classification data indicative of a normal speech sound type, then that user device has its audio data prioritised.

The term "normal speech sound type" will be described later on.

Example embodiments therefore prevent transmission of audio data from one or more user devices, other than that user device providing prioritized audio, if their associated classification data is indicative of a restricted sound type.

The restricted sound type may comprise a normal speech sound type other than an interjection sound type. An interjection sound type may also represent speech, but has different characteristics to a normal speech sound type. The two types of speech sound may be distinguished based on the classification data, to be described later on. The idea here is that normal speech from a user should not interfere with normal speech from a prioritised user, i.e. that which provided the prioritised audio data. The prioritised user may be a dominant speaker, e.g. that user currently presenting. However, other sound types, including interjection sound types, can be transmitted.

This therefore prevents normal speech sounds from two or more competing users, e.g. the first and second users 210, 211 being mixed for the current time frame $t_c$. The prioritised user is given preference.

The term "preventing" may mean that the mixer 312 is controlled so as not to mix audio data associated with a restricted sound type. Alternatively, said audio data may not be decoded by the second decoder 306 and is therefore not presented to the mixer 312. Alternatively, or additionally, said audio data, if decoded, may be attenuated at the mixer 312.

Transmission of the audio data provided by one or more of the plurality of user devices, other than the second user device 202, may be allowed, based on the respective associated classification data being a non-restricted sound type. In other words, audio data of a non-restricted sound type may be decoded, mixed and transmitted to the other user devices as part of the conference stream. This ensures a more natural experience without excessive muting effects.

A non-restricted sound type may comprise one or more of: a silence or background noise sound type; a coughing sound type; an emotive sound type; a singing sound type; and an interjection sound type. These may be user configurable to include more or fewer sound types.

The classification data may be generated at each of the user devices, e.g. at the first, second and third user devices 100, 202, 203 in the FIG. 4 system.

For example, the classifier 410 of the first user device 100 may be configured to receive the first audio signal 303 and to classify it into one of a plurality of predetermined sound types, such as one of:

a normal speech sound type;

a silence or background noise sound type;

a coughing sound type;

an emotive sound type;

a singing sound type; and an interjection sound type.

The classifier 410 may comprise one or more machine learned models. The one or more machine learned models may comprise, for example, a neural network; a recurrent neural network; a regression model; a reinforcement learning model; a support vector machine; and/or a random forest. The one or more machine learned models may comprise one or more models that have been trained using machine learning techniques or algorithms to determine which of the above predetermined sound types received audio data most likely represents. In general, a machine learned model takes in input data and processes it according to a set of learned parameter values that have been determined using a training or fitting process to generate output data, in this case a classification result. The classifier 410 may use one or more machine learned algorithms such as k-nearest neighbour (kNN), self-organizing maps (SOM) or a support vector machine (SVM). Audio features such as Mel-Frequency Cepstral Coefficients (MFCC), spectral centroid, spectral spread, bandwidth and zero-crossing rate (ZCR) features may be extracted from the received microphone signal 303 which may then be used for classification purposes rather than the audio signal itself. One of the most popular classifier types is a Convolutional Neural Network (CNN).

The use of one or more machine learned networks for the classifier 410 is not essential and there may be other methods of distinguishing between sound types, even in a language independent way. For example, normal speech sound types may be distinguished from interjection sound types (both comprise human speech) based on the latter comprising fewer words and/or having a shorter duration compared with the former. One or more keywords or utterances may be predefined for classifying interjection sound types, such as a "hang on" or "excuse me" or "may I interject". It may be that only these utterances can be classified as interjection sound types.

Speech based detection can be used for this purpose. Other sounds not comprising human speech may be categorised as "other" sound types which may collectively be considered non-restricted sound types.

The classifier 410 may operate in a continuous way on the first user device 100, for example providing classification data indicative of the classification result at a rate of between 0.5 and 4 Hz.

The controller 420 may be configured, based on the received classification data, and also based on which audio data is prioritised, either to allow or restrict transmission of the audio data corresponding to the first audio signal 303. This may be performed by controlling mixing of said audio data by the mixer 312. For example, if the audio data corresponding to the first audio signal, or the microphone signal 303, is a non-restricted sound type, the controller 420 may permit its mixing. If the audio data is a restricted sound type, e.g. normal human speech, and another user device, e.g. the second user device 202, has its audio data prioritised which was also the case in the previous time frame $t_c-1$, then the controller 420 may prevent its mixing. The controller 420 may alternatively prevent its decoding by the second decoder 306. Note that the classification data can be received relatively quickly over the channel 310 compared with the audio data from the first encoder 302. Therefore, the controller 420 may alternatively prevent encoding and/or transmission by the first user device 100.

The above procedure may be followed for other signals and data from the other user devices which are part of the conference session. It is possible that more than one user may be considered as interfering at a given time frame.

In the event of prevented mixing of an audio signal, the controller 420 may also issue notification data for sending via the channel 310 to a user interface (UI) 420 of the relevant user device, in this case the first user device 100 if their audio signal interferes with a prioritised audio signal. This may be an audible and/or visual and/or haptic notification which informs the user, i.e. the first user 210 that the other users cannot hear their audio. Possible audible notifications may include a warning sound, a version of the user's own voice with an effect such as delay, echo or similar, or to play the prioritised user's audio with emphasis, e.g. with an effect that makes it sound louder. A notification can remain for as long as the classifier 410 is classifying the audio data as a restricted sound type. The effect of the notification is to prompt the interfering user to stop speaking.

Because classification is performed at the client end, i.e. in the first user device 100 in the shown example, and the controller 420 is effectively comparing classification classes and acting on predetermined decision logic, there is relatively little delay so that the interfering user is informed very quickly via the above notification.

It may be that classifying human speech audio data either into a normal speech type or interjection type, which may not be trivial, can involve delays which is not desirable.

Figure 6:
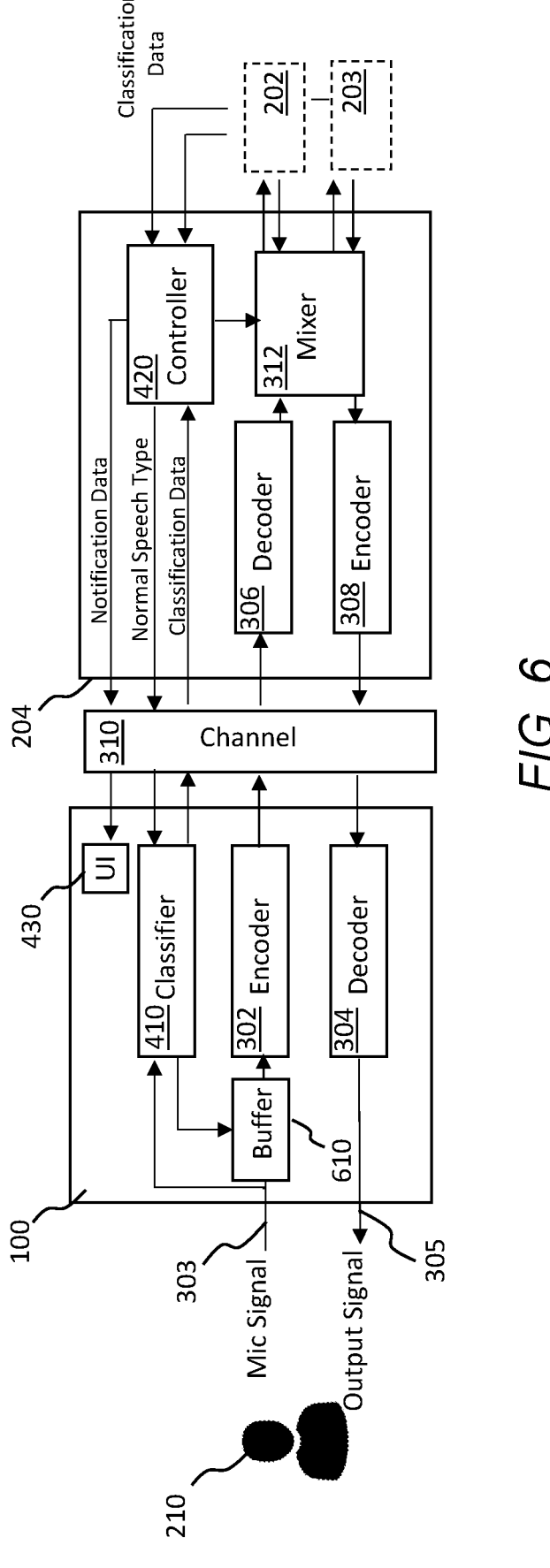
FIG. 6 is a schematic block diagram of functional modules including a first user device and conference server according to one or more other example embodiments.

FIG. 6 is a block diagram similar to that shown in FIG. 4 which includes a buffer 610 for reducing such delays. The shown system comprises the first user device 100 and the conference server 204 adapted according to one or more example embodiments. The first user device 100 may comprise the first encoder 302 and first decoder 304 as described in relation to FIG. 3. The first user device 100 may also comprise a classifier 410 and, optionally, a user interface, UI, 430. The first user device 100 may also comprise a buffer 610 between the audio input and the first encoder 302 and classifier 410. The conference server 204 is additionally configured to indicate to the classifier 410, over the channel 310, if another user device, e.g. the second user device 202, is prioritised, e.g. due to its classification being one of a normal speech type in the current time frame $f_c$ and the previous time frame $f_{c-1}$. Upon receipt of this indication at the classifier 410, and in the event that the first audio signal 303 also represents human speech, the classifier 410 is configured to progressively store the first audio signal 303 in the buffer 610 without encoding and/or transmitting to the conference server 204. When the classifier 410 makes its classification, audio data corresponding to the first audio signal 303 may be encoded and transmitted. If classified as normal speech type, the audio data need not be encoded or transmitted, or it can be encoded and transmitted but will not be mixed by the mixer 312 because it represents a restricted sound type. If classified as an interjection sound type, the audio data will be encoded, transmitted and mixed, but a relatively small buffering delay will likely not affect user experience. This implementation may improve the overall user experience enabling more reliable (longer) classification processing at the client end.

FIG. 7 is a flow diagram indicating processing operations that may be performed by, for example, a client device, such as any of the first to third user devices 100, 202, 203 shown in FIG. 2 according to one or more example embodiments. The processing operations may be performed by means of hardware, software, firmware or a combination thereof.

A first operation 701 may comprise receiving audio data from one or more microphones of a user device for a current time frame.

A second operation 702 may comprise classifying the audio data into one of a plurality of predetermined sound types.

A third operation 703 may comprise generating associated classification data indicative of the predetermined sound type for the current time frame.

A fourth operation 704 may comprise transmitting the audio data and the associated classification data to a remote apparatus for preventing or allowing transmission of the audio data to other devices as part of a conference call based at least on the associated classification data.

The classification data may be indicative of a sound type comprising one or more of:

a normal speech sound type;

a silence or background noise sound type;

a coughing sound type;

an emotive sound type;

a singing sound type; and an interjection sound type.

The audio data comprises speech, wherein a normal speech sound type may be identified as comprising speech having at least a threshold number of words in the current time frame and wherein an interjection sound type may be identified as comprising less than the threshold number of words in the current time frame. Alternatively, or additionally, the length of the speech may be considered whereby, for example, speech that has a duration of less than a threshold, e.g. one second, may be identified as an interjection sound type whereas speech having a duration above this threshold may be identified as a normal speech sound type. Alternatively, one or more machine learned models may be used.

As noted above, the classifier may be configured to buffer the audio data in a buffer 610 (a form of memory) of the apparatus until it is determined if the speech is classified as a normal speech sound type or an interjection sound type. The audio signal and the associated classification data may be transmitted when the classification is complete. If the signal is classified as interjection, the effect of buffering may be reversed e.g. by resampling the signal to a higher playback rate or by ignoring a low power section of signal after the interjection.

In some example embodiments, what constitutes a permitted sound type may be user configurable. For example, a user may allow laughing sound types to be mixed but coughing, singing or crying is not permitted, i.e. restricted, when that user is prioritised. It is possible that no interruptions are permitted, i.e. a user restricts all sound types when that user is prioritised.

Although example embodiments depict that classification by the classifier is performed at the client end, e.g. at the first user device 100, classification could be performed at the conference server 204. The general operation may also be implemented using a peer-to-peer architecture where there is no separate conference server 204. At least part of the conference server 204 functionality may be provided in each of the user devices which may communicate directly with one another.

Example Apparatus

Figures 8, 9:
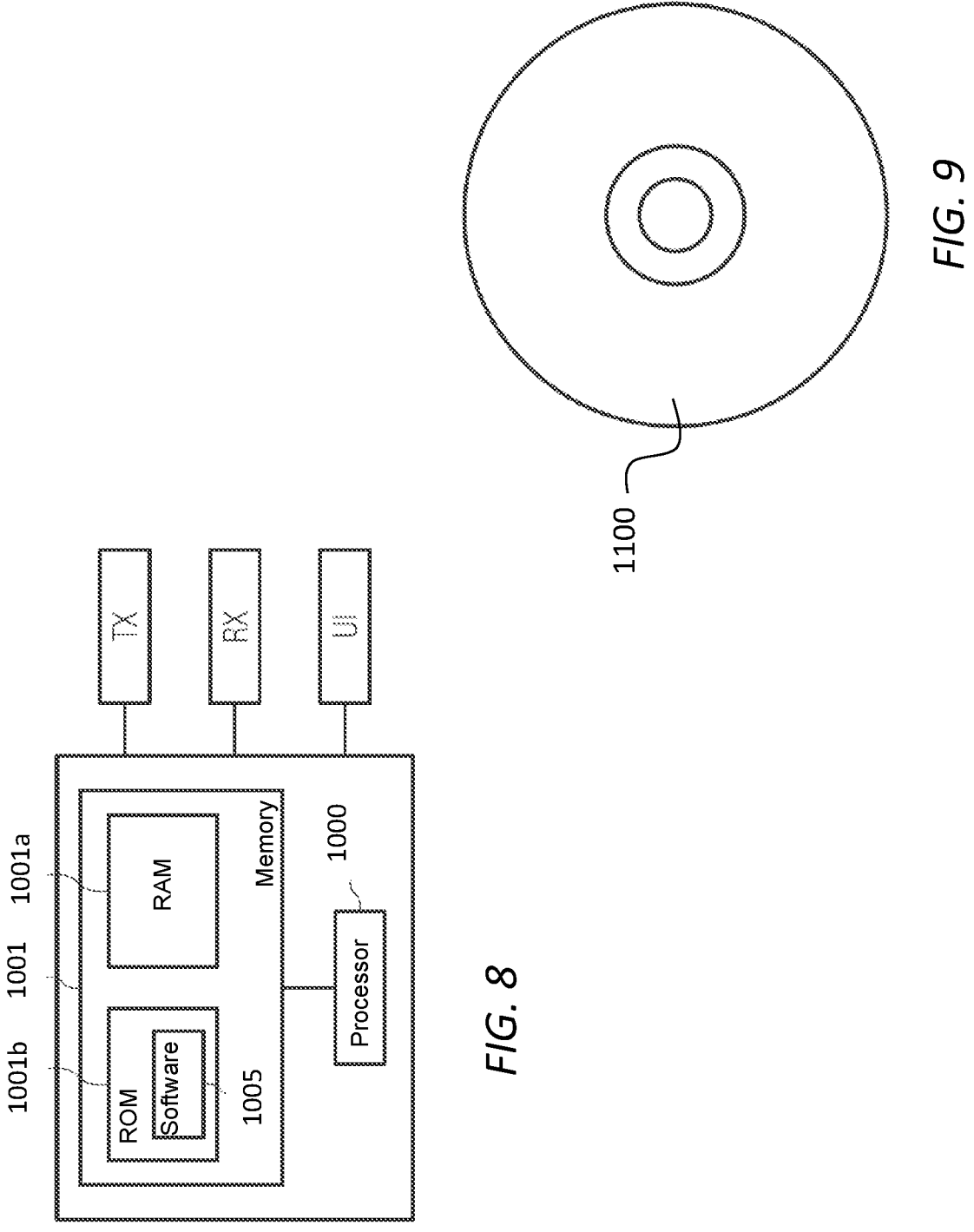
FIG. 8 is a schematic block diagram of an apparatus according to one or more example embodiments.
FIG. 9 is a non-transitory medium for storing computer-readable instructions which, when executed or processed by one or more processors of an apparatus, may perform operations according to one or more example embodiments.

FIG. 8 shows an apparatus according to some example embodiments. The apparatus may be configured to perform the operations described herein, for example operations described with reference to any disclosed process. The apparatus comprises at least one processor 1000 and at least one memory 1001 directly or closely connected to the processor. The memory 1001 includes at least one random access memory (RAM) 1001a and at least one read-only memory (ROM) 1001b. Computer program code (software) 1005 is stored in the ROM 1001b. The apparatus may be connected to a transmitter (TX) and a receiver (RX). The apparatus may, optionally, be connected with a user interface (UI) for instructing the apparatus and/or for outputting data. The at least one processor 1000, with the at least one memory 1001 and the computer program code 1005 are arranged to cause the apparatus to at least perform at least the method according to any preceding process, for example as disclosed in relation to the flow diagrams of FIG. 5 and FIG. 7 and related features thereof.

FIG. 9 shows a non-transitory media 1100 according to some embodiments. The non-transitory media 1100 is a computer readable storage medium. It may be e.g. a CD, a DVD, a USB stick, a blue ray disk, etc. The non-transitory media 1100 stores computer program instructions, causing an apparatus to perform the method of any preceding process for example as disclosed in relation to the flow diagrams of FIG. 5 and FIG. 7 and related features thereof.

Names of network elements, protocols, and methods are based on current standards. In other versions or other technologies, the names of these network elements and/or protocols and/or methods may be different, as long as they provide a corresponding functionality. For example, embodiments may be deployed in 2G/3G/4G/5G networks and further generations of 3GPP but also in non-3GPP radio networks such as WiFi.

A memory may be volatile or non-volatile. It may be e.g. a RAM, a SRAM, a flash memory, a FPGA block ram, a DCD, a CD, a USB stick, and a blue ray disk.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some embodiments may be implemented in the cloud.

It is to be understood that what is described above is what is presently considered the preferred embodiments. However, it should be noted that the description of the preferred embodiments is given by way of example only and that various modifications may be made without departing from the scope as defined by the appended claims.

The invention claimed is:

1. An apparatus comprising:

at least one processor; and at least one memory storing instructions that, when executed by the at least one processor, cause the apparatus at least to:

provide audio data based on associated classification data received from a plurality of user devices as part of a conference call, the plurality of user devices including at least a first user device and a second user device, the associated classification data indicative of one of a plurality of predetermined sound types represented by the audio data in a current time frame, the plurality of predetermined sound types comprising at least a silence or background noise sound type, a coughing sound type, an emotive sound type, a singing sound type, and an interjection sound type;

determine that the audio data provided by the first user device is to be prioritized; and control transmission of the audio data as part of the conference call by preventing transmission of audio data associated with the second user device based on (i) its associated classification data being indicative of a restricted sound type and (ii) the audio data provided by the first user device being prioritized.

2. The apparatus of claim 1, wherein the controlling further comprises allow transmission of the audio data provided by one or more of the plurality of user devices, other than the second user device, based on the respective associated classification data being a non-restricted sound type.

3. The apparatus of claim 1, wherein the controlling further comprises control mixing of the audio data.

4. The apparatus of claim 1, wherein the audio data provided by the first user device is prioritized based on its associated classification data being indicative of a normal speech sound type in the current time frame and audio data provided by the first user device being prioritized in a previous time frame.

5. The apparatus of claim 1, wherein the audio data provided by the first user device is prioritized based on its associated classification data being indicative of a normal speech sound type in the current time frame and classification data, associated with a different user device which provided prioritized data in a previous time frame, no longer being indicative of a normal speech sound type in the current time frame.

6. The apparatus of claim 1, wherein the audio data provided by the first user device is prioritized based on: its associated classification data being indicative of a normal speech sound type in the current time frame; classification data associated with devices other that the first user device not being indicative of a normal speech sound type in the current time frame; and no audio data being prioritized in a previous time frame.

7. The apparatus of claim 5, wherein a plurality of candidate user devices having associated classification data indicative of a normal speech type are identified in the current time frame and wherein the first user device is selected from the candidate user devices based on a prede-termined selection algorithm, wherein, optionally, the pre-determined selection algorithm selects the first user device based on one or more of:

a predetermined order of the plurality of candidate user devices;

the candidate user device that set-up or is hosting the conference call; or respective transmission latencies associated with the plu-rality of candidate user devices.

8. The apparatus of claim 1, wherein the restricted sound type comprises a normal speech sound type other than an interjection sound type.

9. The apparatus of claim 1, further caused to send a notification to the second user device for informing a user thereof of the prevented transmission.

10. The apparatus of claim 1, wherein the providing further comprises:

receive the audio data from the plurality of user devices for the current time frame;

classify the audio data into one of a plurality of prede-termined sound types; and generate the classification data associated with the respec-tive audio data indicative of the predetermined sound type for the current time frame.

11. A user device comprising:

at least one processor; and at least one memory storing instructions that, when executed by the at least one processor, cause the user device at least to:

receive, at the user device, audio data from one or more microphones of the user device for a current time frame;

classify, at the user device, the audio data into one of a plurality of predetermined sound types comprising at least a silence or background noise sound type, a coughing sound type, an emotive sound type, a singing sound type, and an interjection sound type;

generate, at the user device, associated classification data indicative of the predetermined sound type for the current time frame; and transmit, from the user device to a remote apparatus, the audio data and the associated classification data to enable the remote apparatus to prevent or allow trans-mission of the audio data to other devices as part of a conference call based at least on the associated classi-fication data.

12. The apparatus of claim 11, wherein the audio data comprises speech, and wherein the classifying further com-prises:

buffer the audio data in a memory of the apparatus until it is determined if the speech is classified as a normal speech sound type or an interjection sound type, and transmit the audio signal and the associated classifica-tion data when the classification is complete.

13. A method comprising:

providing audio data based on associated classification data received from a plurality of user devices as part of a conference call, the plurality of user devices including at least a first user device and a second user device, the associated classification data indicative of one of a plurality of predetermined sound types represented by the audio data in a current time frame, the plurality of predetermined sound types comprising at least a silence or background noise sound type, a coughing sound type, an emotive sound type, a singing sound type, and an interjection sound type;

determining that the audio data provided by the first user device is associated with a dominant speaker; and controlling transmission of the audio data as part of the conference call by preventing transmission of audio data associated with at least the second user device based on (i) its associated classification data being indicative of a restricted sound type and (ii) the first user device being associated with a dominant speaker.

14. The method of claim 13, wherein the controlling further comprises allowing transmission of the audio data provided by one or more of the plurality of user devices, other than the second user device, based on the respective associated classification data being a non-restricted sound type.

15. The method of claim 13, wherein the controlling further comprises controlling mixing of the audio data.

16. The method of claim 13, wherein the audio data provided by the first user device is prioritized based on its associated classification data being indicative of a normal speech sound type in the current time frame and audio data provided by the first user device being prioritized in a previous time frame.

17. The method of claim 13, wherein the audio data provided by the first user device is prioritized based on its associated classification data being indicative of a normal speech sound type in the current time frame and classifica-tion data, associated with a different user device which provided prioritized data in a previous time frame, no longer being indicative of a normal speech sound type in the current time frame.

18. The method of claim 14, wherein the audio data provided by the first user device is prioritized based on: its associated classification data being indicative of a normal speech sound type in the current time frame; classification data associated with devices other that the first user device not being indicative of a normal speech sound type in the current time frame; and no audio data being prioritized in a previous time frame.

19. The method of claim 18, wherein a plurality of candidate user devices having associated classification data indicative of a normal speech type are identified in the current time frame and wherein the first user device is selected from the candidate user devices based on a predetermined selection algorithm, wherein, optionally, the predetermined selection algorithm selects the first user device based on one or more of:

a predetermined order of the plurality of candidate user devices;

the candidate user device that set-up or is hosting the conference call; or respective transmission latencies associated with the plurality of candidate user devices.

* * * * *